United States Patent Office 3,210,158
Patented Oct. 5, 1965

3,210,158
PROCESS FOR THE PRODUCTION OF CHLORINE
Willem F. Engel and Freddy Wattimena, Amsterdam, Netherlands, assignors to Shell Oil Company, New York, N.Y., a corporation of Delaware
No Drawing. Filed Jan. 17, 1961, Ser. No. 83,134
Claims priority, application Netherlands, Jan. 20, 1960, 247,564
8 Claims. (Cl. 23—219)

The invention relates to the production of chlorine by a process related to the Deacon process, in which hydrogen chloride is oxidized with air with the aid of a copper compound as catalyst.

Better results have been obtained according to the invention than were possible with any process hitherto known. Very high conversions, substantially equal to the conversions corresponding with the equilibrium are obtained at high space velocities and relatively low temperatures. The low temperatures also have the following advantages: (a) the copper compounds are not volatile, (b) the conversion corresponding with the equilibrium is high and therefore little initial material is to be recycled, and (c) there is practically no corrosion.

In the process of the invention a gaseous mixture containing hydrogen chloride and oxygen is passed over a catalyst containing (a) one or more copper chlorides, (b) one or more chlorides of metals of the rare earth metal group, including scandium, yttrium, zirconium, thorium and uranium, the ratio in atoms of rare earth metal to copper being at least 0.1, and (c) one or more alkali metal chlorides. Whenever reference is made here to chlorides, this term also includes oxychlorides.

In the preparation of the present catalysts the starting materials may be compounds other than chlorides, provided these other compounds are converted into chlorides and/or oxychlorides under the influence of the gaseous mixture containing hydrogen chloride and oxygen.

The rare earth metal group is defined in the literature in various ways. In a narrower sense the rare earth metals are the fifteen elements having atomic numbers of from 57 to 71, the so-called lanthanides. In this specification five other elements, namely, scandium, yttrium, zirconium, thorium and uranium, are meant in addition to those just referred to. For the sake of brevity, the term "rare earth metals" is used in this specification to denote both the lanthanides and the five other elements.

Among the rare earth metals as defined above, the lanthanides are preferred and among the lanthanides particularly those the highest possible valency of which is lower than 4. Lanthanides with a valency which is always lower than 4 are lanthanum and those with atomic numbers between 59 and 64, both inclusive, to wit praseodymium, neodymium, illinium, samarium, europium and gadolimium. Particularly recommended is a mixture in which lanthanum is present together with one or more lanthanides with atomic numbers between 59 and 64, for instance a mixture known as didymium. This mixture mainly consists of lanthanum and neodymium, together with smaller quantities of praseodymium and samarium. The following analysis is given by way of example: $La_2O_3$ 45%, $Nd_2O_3$ 38%, $Pr_6O_{11}$ 11%, $Sm_2O_3$ 4%, various 2%.

In view of the activity of the catalyst atomic ratios of rare earth metals to copper of at least 0.15 are preferable. The highest activities of these catalysts are obtained when the atomic ratio of alkali metal to copper is between 0.6 and 3, particularly when this atomic ratio is not less than 0.8 and not more than 1.2.

The activity of these catalysts is also greatly increased when the mixture of compounds of copper, one or more rare earth metals and one or more alkali metals is entirely or partly present in the molten state.

The catalysts according to the invention are preferably supported on carriers. Various materials (pumice, ceramic material, etc.) usually employed as such in related processes may also be used as carriers in the present case, but by far the best results are obtained with silica gel as carrier, particularly when the mixture of compounds of copper, one or more rare earth metals and one or more alkali metals is entirely or partly present in a molten state, especially with silica gel having a surface area of at least 200 m.$^2$/g. with an average pore diameter of at least 60 A.

In addition to the surface area, the average pore diameter of the carrier is important in the present case. Although the activity of catalysts generally increases with the surface area, in the case of the catalysts according to the invention, in which the active components are entirely or partly present in the form of a melt, this only applies insofar as the pore diameter does not become too small. Presumably, the melt of catalyst constituents should be capable of wetting the inner walls of the pores without making these pores inaccessible to the reacting gas mixture.

The catalyst compositions according to the invention are excellently suitable for use in a fluidized state, especially when supported on a suitable carrier. This applies particularly when the above-mentioned ratios of copper to alkali metals are observed.

Comparative experiments in which various alkali metal compounds in mixtures according to the invention were used under similar conditions, showed that with the optimum alkali metal copper ratios potassium, sodium and lithium differ very little as regards activity. When using sodium or lithium compounds, the alkali metal/copper ratio could be raised considerably in fixed catalyst beds without substantially reducing the activity. This was not, however, the case when potassium compounds were used. For all alkali metals, a reduction of the said ratio below the optimum value caused a very sharp decline in activity. With regard to fluidizability, mixtures in which potassium was used as the alkali metal proved to be the least sensitive to fluctuations in the alkali metal/copper ratio. It was found that deviations from the favorable alkali metal/copper ratios while the catalyst is being used may lead to deposition of crystals on the surface of the carrier particles and in the pores thereof. The crystals could be observed through the microscope, and their nature determined in polarized light. It is assumed that on the one hand this deposition of crystals reduces the accessibility of the pores, and hence the activity, and that on the other hand it impairs the fluidizability by changing the nature of the particle surface.

To facilitate the formation or maintenance of a melt it may be advantageous to use mixtures of compounds of compounds of different alkali metals. For the same purpose, compounds, preferably chlorides of other metals, such as silver, lead or tin may be incorporated in the mixture.

Suitable temperatures for carrying out the process according to the invention lie mainly between 300° C. and 425° C. particularly between 330° C. and 400° C., but higher and lower temperatures are possible in principle.

The carrier-supported catalysts according to the invention generally have a copper content of between 1 and 20% by weight, calculated as metal referred to the total of metals plus carrier. The total rare earth metal content generally lies within corresponding limits, calculated in the same manner.

Also embraced in our invention, is the production of the above-mentioned new catalysts from chlorides of copper, rare earth metals and alkali metals and moreover a process is contemplated in which, instead of compounding the catalysst from chlorides, a pre-catalyst is prepared either entirely or partly from compounds other than chlorides (possibly partly from chlorides), which precatalyst may be converted by the action of gaseous mixtures containing hydrogen chloride and oxygen into a catalyst suitable for the production of chlorine. The said compounds other than chlorides, which are converted into chlorides by the action of gaseous mixtures containing hydrogen chloride and oxygen, are, for example, oxides, hydroxides, nitrates, carbonates, acetates, etc. The various metal compounds may be supported on carriers in a conventional manner by adsorption, precipitation, etc.

*Example I*

*Production of the catalysts*

The carrier was dried for two hours at 500° C. and then impregnated with a solution of the chlorides of copper, one or more rare earth metals and one or more alkali metals. In each experiment a quantity of carrier was mixed with the maximum quantity of solution that could be taken up by the pores of the carrier. The concentration of each constituent in the solution was so adjusted that the desired content of this constituent was incorporated in the carrier. The impregnated carrier was dried and heated for three hours in an air stream to 250° C.

The contents specified are always the percentages by weight of the metal in question, calculated with reference to the total weight of the metals present and the carrier. Thus if the amounts specified are 5% Cu, 5% Ce, 3% K, this means that for 5 parts by weight of Cu, 5 parts by weight of Ce and 3 parts by weight of potassium, $100-(5+5+3)=87$ parts by weight of carrier were also present. As the metals are present in the form of compounds, the metal contents in the catalyst as a whole are in fact lower than the values specified.

Except where otherwise stated, fixed catalyst beds were used.

*Example II*

EFFECT OF ALKALI COMPOUNDS AND THE ALKALI METAL/COPPER RATIO

The carrier used was silica gel having a particle size of 75–150 microns, an average pore diameter of 30 A. and a surface area of 390 m.$^2$/g. The catalyst contained 5% copper and 5% didymium. The atomic ratio of total of alkali metal to copper was invariably 1. The HCl/air ratio was the stoichiometric one. The space velocity was 40 litres of gaseous HCl per kg. of catalyst per hour. The varied conditions and the resulting conversion percentages are summarized in the following table.

| Percent by weight with reference to alkali metal | | | Percent HCl converted into Cl$_2$ | |
|---|---|---|---|---|
| K | Na | Li | At 300° C. | At 350° C. |
| 3.1 | ---- | ---- | 32 | 76 |
| 2.1 | 0.60 | ---- | 45 | 78 |
| 1.56 | 0.92 | ---- | 36 | 79 |
| 1.33 | ---- | 0.32 | 44 | 79 |
| 2.55 | ---- | 0.10 | 37 | 78 |
| ---- | ---- | ---- | ¹ 85 | ¹ 79.5 |

¹ Equilibrium.

The experiments were repeated at 350° C. and a space velocity of 80 litres gaseous HCl per kg. catalyst per hour. The results differed from those above by an average of less than 1%.

*Example III*

EFFECT OF RARE EARTH METALS

To enable the effect of various rare earth metals to be compared, catalysts were prepared containing 5% copper, 5% of a rare earth metal and 5% sodium, supported on silica gel having an average pore diameter of 30 A. and a surface area of 688 m.$^2$/g. The stoichiometric HCl-air mixture was passed over the fixed catalyst beds at a space velocity of 40 litres of gaseous HCl per kg. of catalyst per hour. The following table shows the conversion percentages at various temperatures. The results of two experiments are also given in which the catalyst contained no rare earth metal and which are therefore outside the scope of this invention.

| Rare earth metal | Temperature | | |
|---|---|---|---|
| | 300° C. | 350° C. | 400° C. |
| Non (5% Cu, no alkali) | ---- | 7.5 | 31.5 |
| None (5% Cu, 5% Na) | ---- | 23 | 52 |
| Lanthanum | 31 | 73 | 69.5 |
| Cerium | 38 | 46.5 | 60 |
| Praseodymium | 29 | 71 | 69 |
| Neodymium | 30 | 73 | 71 |
| Samarium | 38 | 73 | 68 |
| Didymium | 32 | 72 | 71 |
| Europium | 43 | 74.5 | 72 |
| Gadolinium | 35 | 69 | 72 |
| Dysprosium | 31 | 63.5 | ---- |
| Yttrium | 31 | 62 | ---- |
| Ytterbium | 19 | 45 | ---- |
| Scandium | 17 | 42 | ---- |
| Equilibrium | 85 | 79.5 | 73 |

*Example IV*

EFFECT OF THE CONCENTRATION OF THE ACTIVE COMPONENTS IN THE CATALYST EFFECT OF THE AVERAGE PORE DIAMETER

[Carrier: silica gel. Space velocity: 40 litres of gaseous HCl per kg. of catalyst per hour]

| Cu, percent | Didymium | Na, percent | Average pore diam., A. | Surface area, m.$^2$/g. | Percent HCl converted into Cl$_2$ | |
|---|---|---|---|---|---|---|
| | | | | | At 300° C | At 350° C |
| 1 | 1 | 1 | 30 | 688 | 16 | 33 |
| 5 | 5 | 5 | 30 | 688 | 32 | 72 |
| 1 | 1 | 1 | 140 | 313 | 15 | 56 |
| 5 | 5 | 5 | 140 | 313 | 39 | 79 |
| 10 | 10 | 10 | 140 | 313 | 32 | 77 |

Example V

EFFECT OF THE CONCENTRATION OF RARE EARTH METAL IN THE CATALYST

[Carrier: silica gel. Average diameter pores: 80A.]

Surface area: 390 m.²/g. Copper content: 5%. Alkali metal content: 3.1% potassium. Space velocity: 80 litres gaseous HCl per kg. catalyst per hour. HCl and air in stoichiometric ratio. Temperature: 350° C. Rare earth metal didymium.

Percent rare earth metal in catalyst: Conversion, percent
- 2.5 — 62
- 5 — 75
- 10 — 79

Example VI

EFFECT OF AVERAGE PORE DIAMETER—EFFECT OF TEMPERATURE

Carrier: silica gel. Copper content: 5%. Content of rare earth metal: 5%. Alkali metal content: 5% sodium. HCl and air in a stoichiometric ratio. The table shows the varied conditions and the conversion percentages.

| Rare earth metal | Average pore diam. | Surface area, m.²/g. | Temperature | | | | |
|---|---|---|---|---|---|---|---|
| | | | 300° C. | 350° C. | | 400° C. | |
| | | | Space velocity, litres gaseous HCl/kg. cat./hour | | | | |
| | | | 40 | 40 | 80 | 40 | 80 |
| Cerium | 30 | 688 | 38 | 66 | | 70 | |
| Do | 80 | 390 | 34.5 | 70 | | 71 | |
| Didymium | 30 | 688 | 38.5 | 73.5 | 65 | 69 | 70 |
| Do | 80 | 390 | 39 | 78.5 | 69 | 71 | 71.5 |
| Do | 140 | 313 | 39 | 79 | 76 | 73 | 72 |
| Equilibrium | | | 85 | 79 | | 73 | |

The cerium used in this example was of technical quality, with 35 percent by weight of didymium.

Example VII

EFFECT OF OPERATING TIME

Carrier: silica gel. Average pore diameter: 140 A. Surface area: 313 m.²/g. Particle size: 2–3 mm. 5% Cu, 5% didymium, 3.1% K. HCl and air in a stoichiometric ratio, space velocity 80 litres of gaseous HCl per kg. of catalyst per hour. Temperature: 350° C.

Operating time hours: Conversion, percent
- 1 — 75
- 20 — 78.5
- 40 — 78
- 60 — 76.5
- 266 — 76.5
- 600 — 76.5

After a starting-up period, the activity remained entirely constant from 50 to 600 hours. The loss of copper was extremely low (<0.015%, calculated as before). No disintegration of the catalyst particles was noticed. At the end of the experiment the space velocity was increased to 120 and 160 litres of gaseous HCl per kg. of catalyst per hour, giving a conversion percentage of 74.5 and 73.5, respectively.

Example VIII

EFFECT OF THE AIR/HCl RATIO

Carrier: silica gel, obtained by extracting silica-alumina containing 12% Al₂O₃ for 24 hours at 20° C. with 4 N HCl. Particle size 20–120 microns. Average pore diameter: 36 A., surface area approximately 800 m.²/g. 5% Cu, 5% didymium, 3.1% K.

The table shows the varied conditions and the conversion percentages from HCl to $Cl_2$.

| Air/HCl volume | 1.19 | | 1.60 | |
|---|---|---|---|---|
| Temperature, °C | 350 | 365 | 350 | 365 |
| Space velocity, liters HCl/kg. cat. per hour: | | | | |
| 40 | 78.5 | | 80 | 79.5 |
| 80 | 75 | | 80 | 80 |
| 120 | 71 | 75 | 77.5 | 79 |

Example IX

FLUIDIZED CATALYST BED

The catalyst was the same as in Example VIII. The catalyst was kept in a fluidized state by a stream of air and HCl mixed in a stoichiometric ratio.

The following table gives the conversion percentages to chlorine at various temperatures and space velocities. Equilibrium was still reached at 365° C. and a space velocity of not less than 160 litres of HCl/kg. of catalyst per hour.

| Space velocity, litres HCl/kg. per hour | 120 | 160 |
|---|---|---|
| Temperature, °C.: | | |
| 350 | 75 | 70 |
| 365 | 77.5 | 77.5 |

We claim as our invention:

1. The process for the production of chlorine which comprises contacting hydrogen chloride in admixture with an oxygen-containing gas, at a temperature of from about 300 to about 425° C., with a catalyst composition consisting of: (a) copper chloride in admixture with (b) a lanthanide chloride, (c) an alkali metal chloride, and (d) silica gel; said copper chloride and lanthanide chloride components each constituting from about 1 to about 20% by weight of said total catalyst composition calculated as uncombined copper and lanthanide metal respectively, and the atomic ratio of alkali metal to copper in said catalyst composition is in the range of from about 0.6 to about 3.

2. The process in accordance with claim 1 wherein said lanthanide chloride component is a chloride of a lanthanide having an atomic number of from 59 to 64 inclusive.

3. The process for the production of chlorine which comprises contacting hydrogen chloride in admixture with an oxygen-containing gas, at a temperature of from about 300 to about 425° C., with a catalyst composition consisting essentially of: (a) copper chloride in admixture with (b) didymium chloride, (c) an alkali metal chloride, and (d) silica gel; said copper chloride and didymium chloride components each constituting from about 1 to about 20% by weight of said total catalyst composition calculated as uncombined copper and didymium metals respectively, and the atomic ratio of alkali metal to copper in said catalyst composition is in the range of from about 0.6 to about 3.

4. The process in accordance with claim 3, wherein said alkali metal chloride is potassium chloride.

5. The process in accordance with claim 3, wherein said alkali metal chloride is sodium chloride.

6. The process in accordance with claim 3, wherein said alkali metal chloride is lithium chloride.

7. The process in accordance with claim 3 wherein said catalyst composition is maintained in the fluidized state.

8. The process in accordance with claim 7 wherein said siliceous catalyst support has a surface area of at least 200 m.²/g. with an average pore size of at least 60 A.

References Cited by the Examiner
UNITED STATES PATENTS

| | | | |
|---|---|---|---|
| 2,163,877 | 6/39 | Hooker | 23—216 |
| 2,204,172 | 6/40 | Balcar | 23—219 |
| 2,204,733 | 6/40 | Miller | 23—219 |
| 2,206,399 | 7/40 | Grosvenor et al. | 23—219 |
| 2,271,056 | 1/42 | Balcar | 23—219 |
| 2,418,930 | 4/47 | Gorin | 23—219 |
| 2,448,255 | 8/48 | De Benedictis et al. | 252—441 |
| 2,451,870 | 10/48 | Richardson et al. | 23—219 |
| 2,510,864 | 6/50 | Cady | 252—441 |
| 2,547,928 | 4/51 | Davis et al. | 23—219 |
| 2,981,696 | 4/61 | Hervert et al. | 252—441 |

MAURICE A. BRINDISI, *Primary Examiner.*